Nov. 13, 1962 C. L. HILDRETH 3,063,797
TITANIUM COMPOUNDS AND PROCESSES OF PRODUCING SAME
Filed March 24, 1960 2 Sheets-Sheet 1
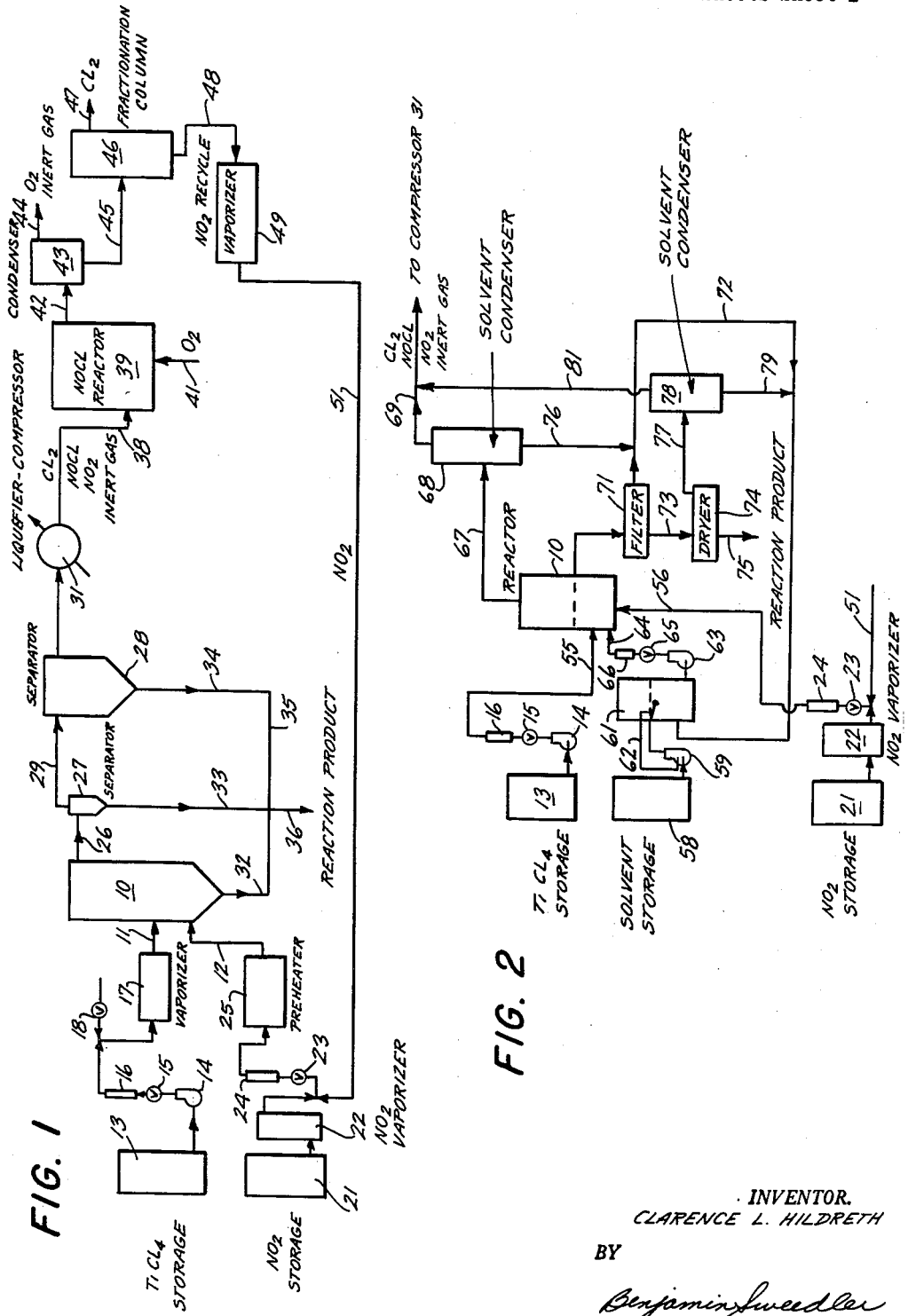
INVENTOR.
CLARENCE L. HILDRETH
BY
Benjamin Sweedler
ATTORNEY Nov. 13, 1962  C. L. HILDRETH  3,063,797
TITANIUM COMPOUNDS AND PROCESSES OF PRODUCING SAME
Filed March 24, 1960  2 Sheets-Sheet 2

INVENTOR.
CLARENCE L. HILDRETH
BY
Benjamin Sweedler
ATTORNEY

United States Patent Office 3,063,797
Patented Nov. 13, 1962

3,063,797
TITANIUM COMPOUNDS AND PROCESSES OF PRODUCING SAME
Clarence L. Hildreth, Amherst, N.Y., assignor to Allied Chemical Corporation, New York, N.Y., a corporation of New York
Filed Mar. 24, 1960, Ser. No. 17,357
16 Claims. (Cl. 23—85)

This invention relates to the production of novel titanium compounds and, more particularly, to the production from titanium tetrachloride of novel amorphous titanium compounds useful as such or readily convertible to either rutile or anatase crystals or pigments. This invention comprehends the novel amorphous titanium compounds alone or admixed with anatase as well as processes of producing such compounds.

All percentages and parts herein, unless otherwise indicated, are on a weight basis.

The vapor phase oxidation of titanium tetrachloride with oxygen or oxygen containing a minor amount of water vapor at reaction temperatures of about 800° to 1400° C. to produce titanium dioxide pigments is well known. It has been suggested to substitute nitrogen dioxide or nitrous oxide for the water vapor in such reactions and to supply the oxygen needed for the oxidation by using nitrous oxide alone (United States Patent 2,502,347 granted March 28, 1950).

Such procedures are objectionable, among other reasons, because of the highly corrosive nature of the reaction products at these high temperatures. The minimization of these corrosion problems is an important object of the present invention.

Another object of this invention is to provide a process of oxidizing titanium tetrachloride, which process is flexible in that it results in a reactive titanium compound, useful as such, or which can be converted readily into the rutile or anatase crystalline form.

Still another object of this invention is to provide such process which can be carried out at temperatures far below those commonly used in the oxidation of titanium tetrachloride to produce titanium dioxide, with good yields and with all the advantages inherent in such low temperature operation.

A further object of this invention is to provide novel amorphous or non-crystalline titanium compounds which are useful as such and are also readily convertible to either anatase or rutile crystals.

These and other objects which will be apparent from the description which follows are accomplished by the present invention which involves reaction of titanium tetrachloride, in the vapor or liquid phase, with nitrogen dioxide at temperatures below 450° C. By nitrogen dioxide is meant $NO_2$ or $N_2O_4$ or mixtures of $NO_2$ and $N_2O_4$.

At temperatures below 300° C., the reaction product is an amorphous or non-crystalline titanium oxychloride which upon subsequent heating is converted predominantly to titanium dioxide together with from 5% to 20%, preferably from 10% to 15% titanium tetrachloride, which is volatilized. The reaction product may also contain from about 0.5% to 5%, preferably about 0.5% to 2%, adsorbed chlorine and from 0% to 8% adsorbed nitrogen compounds such as nitrogen dioxide and/or nitrosyl chloride, which are also removed by heating. The reaction mixture leaving the reactor, in addition to the reaction product, contains the nitrosyl chloride and chlorine formed in the reaction as well as the excess of nitrogen dioxide usually employed in carrying out the reaction.

At temperatures above 300° C. and below 450° C., some crystalline titanium dioxide is produced, namely anatase, along with the amorphous or non-crystalline titanium oxychloride described above. The amount of such crystalline titanium dioxide formed increases with increase in temperature. At 450° C., the reaction product is from about 40% to 60% anatase and from 40% to 60% amorphous or non-crystalline titanium oxychloride described above.

After separation of the itanium reaction product from the nitrosyl chloride and chlorine gases, the gas mixture may be separated into nitrosyl chloride and chlorine fractions by the procedure disclosed, for example, in United States Patent 2,247,470 granted July 1, 1941. The chlorine is, of course, a valuable by-product. The nitrosyl chloride may be oxidized, for example, as disclosed in United States Patent 2,297,281 granted September 29, 1942, to produce nitrogen dioxide and chlorine; the resultant gaseous mixture is fractionally distilled to separate the chlorine from the nitrogen dioxide and the nitrogen dioxide recycled through the reactor where the reaction between the titanium tetrachloride and the nitrogen dioxide takes place. Instead of oxidizing the nitrosyl chloride by the procedure of United States Patent 2,297,281, a stoichiometric mixture of 95% oxygen with 90% nitrosyl chloride preheated to about 175° C. at 4 atmospheres is passed through a reactor in which the mixture of gases react, adiabatically, the reaction mixture being thus heated to about 350° C. The effluent gases are condensed by cooling with water, followed by brine and nitrogen and unreacted oxygen bled off. The condensed product is fractionally distilled to remove pure nitrogen tetroxide as bottoms and a mixture of chlorine and nitrosyl chloride from the top. This latter mixture may be fractionally distilled to give chlorine, removed as product, and a mixture of nitrosyl chloride and chlorine, which mixture is returned to the oxidation.

Alternatively, the mixture of nitrosyl chloride and chlorine produced in the process may be subjected to oxidation using air or relatively pure oxygen to convert the nitrosyl chloride to nitrogen dioxide and chlorine, and the resultant mixture fractionally distilled to separate the chlorine from the nitrogen dioxide, the latter being recycled through the reactor in which the reaction between the nitrogen dioxide and the titanium tetrachloride takes place.

The reaction products produced in the reactor, whether at temperatures below 300° C., in which case they are entirely amorphous or non-crystalline, or at temperatures below 450° C., in which case they contain crystalline titanium dioxide (anatase), are highly reactive. They are useful as such, for example, as an additive in the manufacture of paper pulp.

Desirably the reaction products, particularly those produced at temperatures below 300° C., are given a low temperautre calcination, i.e., heated in air at a temperature of from 200° to 400° C. for from 1 to 24 hours to remove the chlorine, titanium tetrachloride, and also nitrosyl chloride and nitrogen dioxide, if present. At higher temperatures within this range of from 200° to 400° C., the heating time should be shorter, of the order of from 1 to 1½ hours; at lower temperatures within this range, the heating time should be longer, e.g., from 6 to 12 hours.

The low temperature calcination products thus produced, which will hereinafter be referred to as the pretreated products to distinguish them from the reaction products, contain from 40% to 60% anatase and from 40% to 60% non-crystalline or amorphous titanium dioxide. This pretreated product differs from the reaction product chiefly in that it is substantially free of adsorbed titanium tetrachloride and adsorbed chlorine. The pretreated products may be used as such or may be further processed to produce products consisting substantially entirely of anatase or, alternatively, of rutile.

To convert the pretreated products to anatase, the pretreated products are mixed with from 0.05% to 0.25% of an inhibitor which inhibits the formation of rutile and promotes the formation of anatase, such, for example, as potassium sulfate, potassium hydroxide, other potassium salts, alkali metal phosphates including sodium phosphate, or antimony chloride, and heated to 400° to 950° C., preferably from 650° to 900° C., for one-half hour to several hours. The higher the temperature, the less heating time is required. Such conversion may be effected by introducing the pretreated products at room temperature into a calciner such as a kiln through which the pretreated products move continuously and where they are heated to an exit temperature of about 900° C. The residence time within the calciner may be from 5 to 24 hours. Anatase of proper crystal size, i.e., averaging approximately ¼ of a micron, for pigment purposes results.

To convert the pretreated products to rutile, they are mixed with from 0.1% to 0.5% zinc oxide or zinc sulfate, the mixtures heated to 650° to 1000° C. for from one-half hour to several hours; the lower the temperature, the longer the heating time. Instead of zinc oxide or zinc sulfate, other agents well known in the art such as lithium chloride, aluminum sulfate, magnesium sulfate, barium sulfate, or mixtures of such agents may be used. Preferred practice is to introduce the mixtures into a calciner at room temperature and have them pass therethrough exiting at about 1000° C. The residence time within the calciner may be from 5 to 24 hours. Promoters and/or inhibitors or such as aluminum chloride, zinc chloride, and zinc sulfate may be introduced into the reactor and thus incorporated in the reaction product.

Modified pigments of any desired color may be made by adding conventional pigment modifiers to the reaction products and subjecting the resultant mixtures to the aforesaid pretreatment followed by conversion as hereinabove described to anatase or rutile. Such pigments may also be made by adding the modifier to the pretreated products and subjecting the resultant mixtures to further treatment, as hereinabove described, to produce anatase or rutile.

Modifying agents which may be used include chrome alum, chromium nitrate, potassium dichromate, cobaltous nitrate, nickel nitrate, cupric nitrate, ferric sulfate, potassium permanganate, vanadium pentoxide, copper oxide, aluminum oxide, zinc oxide, etc. The amount of modifier incorporated may be from 0.5% to 3% by weight, based on the weight of the titanium dioxide.

In the accompanying drawings, which show several types of equipment in which processes embodying this invention can be carried out:

FIGURE 1 shows somewhat diagrammatically one arrangement of equipment for practicing an embodiment of the invention involving the feed of both the nitrogen dioxide and titanium tetrachloride in the gaseous phase to the reactor;

FIGURE 2 shows somewhat diagrammatically an arrangement of equipment for practicing another embodiment of the invention in which the nitrogen dioxide is supplied to the reactor in the gaseous phase and the titanium tetrachloride in the liquid phase as a solution in a suitable solvent;

Figure 3:
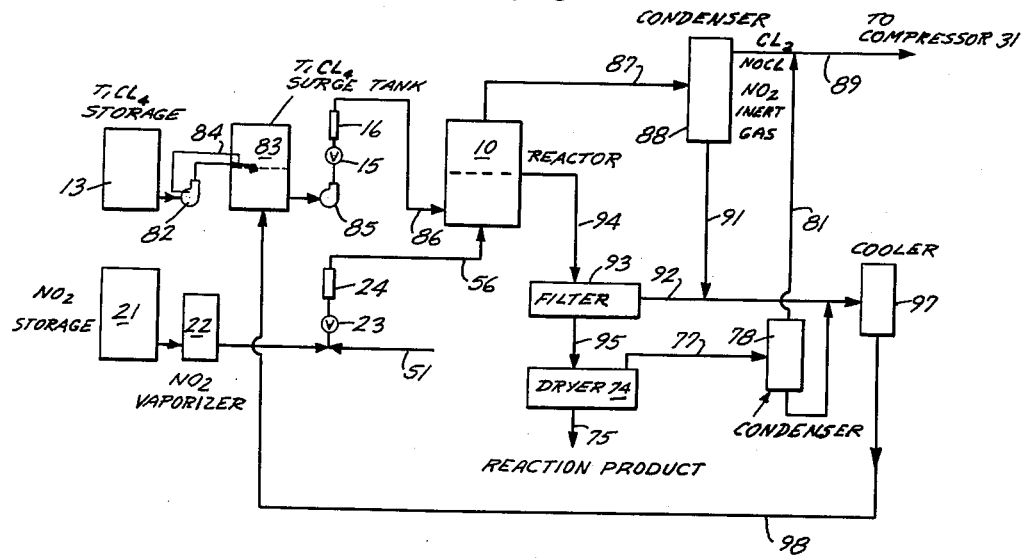
Figure 4:
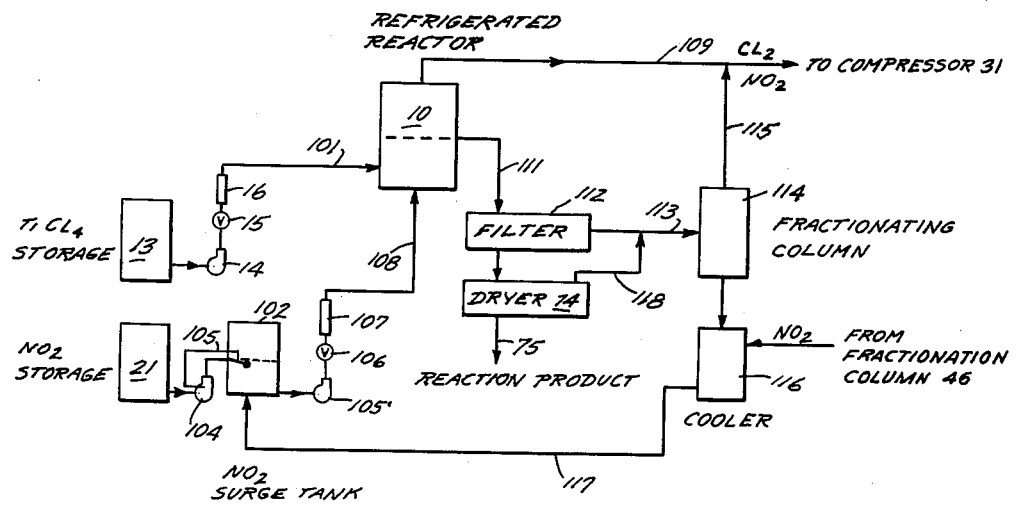

FIGURE 3 shows somewhat diagrammatically another arrangement of equipment for practicing still another embodiment of the invention in which the nitrogen dioxide is supplied to the reactor in the gaseous phase and the titanium tetrachloride in the liquid phase; and FIGURE 4 shows somewhat diagrammatically an arrangement of equipment for practicing still another embodiment of the inventtion in which both the nitrogen dioxide and the titanium tetrachloride are supplied to the reactor in the liquid phase.

Referring first to FIGURE 1 of the drawing, the reactor 10 is supplied with titanium tetrachloride and nitrogen dioxide both in the vapor phase through lines 11 and 12, respectively. Liquid titanium tetrachloride is pumped from storage tank 13 by a pump 14 through a control valve 15 and a flow indicator 16 into a vaporizer 17; the vapors from this vaporizor flow through line 11 into reactor 10. Valve 18 controls the flow of an inert carrier gas such as nitrogen to the vaporizor 17.

Liquid nitrogen dioxide is supplied from the storage tank 21 to a vaporizor 22 from which the vapors flow through a control valve 23, a flow indicator 24 and thence to the nitrogen dioxide preheater 25 communicating with line 12 leading into reactor 10.

Gaseous reaction products containing entrained reaction product leave the top of reactor 10 through line 26 and enter the cyclone separator 27 where initial separation of reaction product from the gases takes place. From the cyclone separator 27, the gas stream containing residual entrained reaction product flows to the bag separator 28 through line 29. From this bag separator 28, gases consisting chiefly of nitrosyl chloride, chlorine, nitrogen dioxide and inert carrier gas enter the liquefier-compressor 31.

Reaction product is withdrawn from the base of the reactor 10 through line 32, from the cyclone separator 27 through line 33 and from the bag separator 28 through line 34. These lines lead into manifold 35 provided with a discharge conduit 36 through which the reaction product is discharged for further treatment as hereinabove described.

Liquefier-compressor 31 effects liquefaction of the nitrosyl chloride, chlorine and nitrogen dioxide in the gaseous stream passing therethrough. The resultant mixture of liquid and inert gas flows through line 38 into the nitrosyl chloride reactor 39, which may be of the type disclosed in United States Patent 2,297,281, having an oxygen inlet 41 and communicating through line 42 with a condenser or cooler 43. In reactor 39, the nitrosyl chloride is oxidized under a pressure of from 150 to 1500 p.s.i.g. and at a temperature of from 50° to 100° C., as disclosed in United States Patent 2,297,281, to produce nitrogen dioxide and chlorine. The reaction products from reactor 39 enter the condenser 43 through line 42 where separation takes place of the oxygen and the inert gas, removed through line 44, from the liquid mixture of chlorine and nitrogen dioxide which flows through line 45 into the fractionating column 46. Here fractionation of this liquid mixture takes place; the chlorine is removed overhead through line 47. The nitrogen dioxide is removed through line 48 and enters the vaporizer 49 where vaporization is effected. The vapors flow through line 51 for recycle through the process.

Reactor 10 may be lined with or built from acid brick, ceramic material, glass, stoneware, glazed steel or aluminum, provided with a cooler, such as a jacket, through which a suitable cooling medium is passed to maintain the aluminum at a maximum temperature of 430° C. Other materials of construction resistant to corrosion under the prevailing conditions may, of course, be used. The filter bag in the bag separator 28 desirably is of polyester material, e.g. Dacron, or other filter medium not attacked by the reaction products.

Vaporizer 17 and preheater 25 heat the titanium tetrachloride and nitrogen dioxide, respectively, to a temperature of from 140° to 550° C., preferably from 140° to 300° C. The temperature in the reactor 10 is maintained within the range of from 140° to 450° C., preferably from 140° to 300° C. This reactor desirably is jacketed for circulation therethrough of a suitable medium to maintain the desired reaction temperature.

In FIGURES 2, 3 and 4, parts corresponding or substantially the same as those shown in FIGURE 1 are indicated by the same reference characters.

In FIGURE 2, liquid titanium tetrachloride is fed to reactor 10 through a line 55 from storage tank 13 by pump 14; line 55 has therein a flow control valve 15 and a flow indicator 16. Nitrogen dioxide gas is supplied to the reactor 10 from the line 56 provided with flow indicator 24 and control valve 23. This line is supplied with nitrogen dioxide gas by vaporizor 22 communicably connected with nitrogen dioxide storage tank 21.

Carbon tetrachloride solvent is supplied to the reactor 10 from a carbon tetrachloride storage tank 58 from which the liquid solvent is pumped by pump 59 into a surge tank 61. This surge tank is provided with a conventional liquid level control device 62 controlling the operation of pump 59 to maintain a substantially constant level of liquid in tank 61. From tank 61 the liquid solvent is pumped by pump 63 through line 64 which leads into reactor 10. Line 64 is provided with flow control valve 65 and a flow indicator 66.

Reactor 10 is provided with an agitator not shown for maintaining the contents therein under agitation. This reactor is jacketed for circulation of a cooling medium. The reaction is conducted at a temperature at which the solvent remains liquid. In the case of carbon tetrachloride the temperature of the reaction mixture when conducted under atmospheric pressure conditions, should be below 75° C. Gaseous reaction products produced consisting chiefly of nitrosyl chloride and chlorine and the excess nitrogen dioxide employed in carrying out the reaction pass overhead through line 67 into a condenser 68 where condensation of carbon tetrachloride solvent is effected. Condenser 68 effects separation of the nitrosyl chloride, chlorine and excess nitrogen dioxide from the solvent; the mixture of nitrosyl chloride, chlorine and excess $NO_2$ leaves condenser 68 through line 69 which communicates with the liquefier-compressor 31 (FIGURE 1).

The reaction product from reactor 10 passes through a filter 71 where separation of the titanium product from the solvent takes place. The solvent is removed through line 72 which communicates with the surge tank 61. The titanium product is discharged through line 73 leading into a dryer 74. From the dryer 74, the titanium product is withdrawn through line 75 for further processing.

The solvent removed in condenser 68 flows through line 76 into line 72 for recycle to the surge tank 61. From the dryer 74 where the product is heated to effect removal of adsorbed solvent, nitrosyl chloride, chlorine and $NO_2$, the vapors flow through line 77 into a condenser 78 where the solvent is condensed and the condensate passed through line 79 into recycle line 72. The nitrosyl chloride, chlorine and nitrogen dioxide are not condensed in condenser 78 but pass overhead through line 81 for admixture with the gases passing through line 69 to liquefier-compressor 31.

The modification of FIGURE 3 shows an arrangement of equipment for reacting liquid titanium tetrachloride with gaseous nitrogen dioxide. In this modification the titanium tetrachloride storage tank 13 communicates with the pump 82 which pumps the liquid titanium tetrachloride into surge tank 83 provided with any well known type of liquid level control 84 for maintaining a substantially constant level of liquid in this tank. From tank 83, pump 85 pumps the liquid titanium tetrachloride through control valve 15, flow indicator 16 and through line 86 leading into reactor 10, which is water cooled to maintain the temperature of the reaction mixture at the desired point below the boiling point of the titanium tetrachloride (136.4° C. at 760 mm. of mercury pressure). Gaseous nitrogen dioxide is supplied to reactor 10 through line 56 which is supplied with the gaseous nitrogen dioxide from the vaporizer 22 supplied with nitrogen dioxide from the nitrogen dioxide storage tank 21. As in the other modification, nitrogen dioxide from the recycle vaporizer 49 (FIGURE 1) may be recycled to the reactor 10; the recycled $NO_2$ flows through control valve 23 and flow indicator 24 through line 56 into reactor 10.

Gaseous reaction products produced in reactor 10 flow through line 87 to a condenser 88 where unreacted titanium tetrachloride is condensed. The nitrosyl chloride, chlorine, excess $NO_2$ and inert carrier gas leave this condenser through line 89 which communicates with compressor 31 (shown in FIGURE 1). The liquid titanium tetrachloride produced in condenser 88 flows through line 91 into line 92 leading from the filter 93 into which the reaction product from reactor 10 is introduced through line 94. The reaction product from which the titanium tetrachloride has been separated leaves filter 93 through line 95 and enters dryer 74 from which the dried reaction product is withdrawn through line 75. As in the modification of FIGURE 2, the gaseous products driven off in dryer 74 flow through line 77 into the condenser 78 where separation of liquid titanium tetrachloride from the gaseous products consisting chiefly of nitrosyl chloride, chlorine and $NO_2$ is effected.

Liquid titanium tetrachloride from condenser 78 is introduced into line 92 leading from filter 93. Line 91 from condenser 88 also communicates with line 92 which discharges into a cooler 97. The cooled titanium tetrachloride is recycled to the surge tank 83 through line 98.

In the modification of FIGURE 4, liquid titanium tetrachloride reacts with liquid nitrogen dioxide. In this modification, reactor 10 is refrigerated by circulation of brine in indirect heat exchange relation or by other suitable refrigeration technique and is provided with suitable agitation means for the reaction mixture, e.g., with a pump for circulating the reaction mixture within the reactor. It is supplied with liquid titanium tetrachloride from storage tank 13 by a pump 14 which pumps the titanium tetrachloride through control valve 15, flow indicator 16, into the liquid feed line 101 which communicates with the reactor 10.

Liquid nitrogen dioxide is supplied to a surge tank 102 from a storage tank 21 by pump 104. Surge tank 102 is provided with a conventional flow control device 105 to maintain a substantially constant level of liquid therein. The liquid nitrogen dioxide is pumped from surge tank 102 by pump 105' through flow control valve 106, flow indicator 107, into line 108 leading into the reactor 10.

Chlorine, nitrosyl chloride produced in and excess nitrogen dioxide supplied to reactor 10, pass through line 109 which communicates with the liquefier-compressor 31 (FIGURE 1).

The slurry liquid and reaction product produced in reactor 10 is removed through line 111 and introduced into a filter 112 where the reaction product is separated from unreacted titanium tetrachloride and nitrogen dioxide. The filtrate passes from filter 112 through line 113 into a fractionating column 114 where the chlorine and nitrosyl chloride distill off overhead and are withdrawn from the column 114 through line 115 which communicates with line 109. The bottoms from column 114 consisting chiefly of nitrogen dioxide is introduced into a cooler 116 where the nitrogen dioxide is refrigerated and the nitrogen dioxide thus produced recycled through line 117 to the surge tank 102.

Reaction product from filter 112 passes to dryer 74. The dried product is removed through line 75. Gases driven off in dryer 74 flow through line 118, into line 113 which communicates with the fractionating column 114.

The following examples are given to illustrate preferred embodiments of the invention, carried out in equipment of the type shown in FIGURES 1 to 4, inclusive, and hereinabove described. It will be appreciated that the invention is not limited to these examples. In these examples, all percentages and parts are on a weight basis; the temperatures are in ° C.

*Example I*

This example involves vapor phase reaction of the titanium tetrachloride and nitrogen dioxide as in FIGURE 1. In this example the reactor 10 is maintained at a temperature of 250°. 1920 parts per hour of liquid titanium tetrachloride are heated to a temperature of 500° and introduced at this temperature into the reactor 10. 1260 parts per hour of nitrogen dioxide are heated to a temperature of 50° to 60°, producing nitrogen dioxide vapors which are then preheated to 500° and introduced into the reactor at this temperature. From the reactor the reaction products, at a temperature of 100° to 130°, pass through a bag filter. The gases consisting of chlorine, nitrosyl chloride and excess nitrogen dioxide pass through the bag filter and are withdrawn from the process. Reaction product in amount of 900 parts per hour is recovered from this bag filter. Analysis of the reaction product shows: 87.1% titanium dioxide, 12.3% titanium tetrachloride and 0.6% chlorine. It is completely amorphous, i.e., 100% noncrystalline.

This reaction product is heated in an air atmosphere at 350° for one hour. The titanium tetrachloride and chlorine are thus removed. 805 parts per hour of pretreated product are obtained consisting of 50% anatase and 50% non-crystalline titanium dioxide. To this product is added 2 parts per hour of potassium hydroxide and 9½ parts per hour of sodium phosphate, and the resultant mixture calcined at 850° for one hour. 800 parts per hour of titanium dioxide are thus obtained.

The titanium dioxide thus produced is cooled rapidly in a water bath and wet-ground with distilled water in an automatic grinder, dried at 110°, cooled and dry-ground. Anatase pigment (100%) results having a tinting strength which compares favorably with commercial products.

Pigment grade rutile is produced from the reaction product of the above example by heating to 250° for 1½ hours to remove titanium tetrachloride and chlorine, and then cooling to room temperature. The cooled material is placed in a Vycor crucible, heated in an oven to 850° for 1½ hours, and then rapidly cooled to room temperature by placing the crucible in a water bath. On analysis, the material showed 96% rutile. Upon grinding, a pigment grade rutile results.

*Example II*

This example, like Example I, involves vapor phase reaction of titanium tetrachloride and nitrogen dioxide. Initially nitrogen is passed through the apparatus until the temperature in the reactor reaches 250°. After this temperature has been attained, the nitrogen dioxide vapor preheated to a temperature of 250° is introduced into the reactor 10 at a rate of 540 parts per hour and the titanium tetrachloride vapor preheated to a temperature of 250° at a rate of 797 parts per hour. These rates represent a 40% excess of nitrogen dioxide over the stoichiometric amount. Nitrogen is added to each stream at a rate of 74 parts per hour. After one hour the flow of titanium tetrachloride and nitrogen dioxide is interrupted, but the flow of nitrogen is continued for one-half hour to purge the apparatus of nitrogen dioxide and reaction gases.

The product is calcined at 500° producing a product X-ray diffraction analysis shows a non-crystalline structure.

The product is calcined to 500° producing a product consisting of 98% to 99% anatase and 1% or 2% rutile.

*Example III*

This example differs from Example II chiefly in that the reaction is carried out at a temperature of 150° and the excess of nitrogen dioxide used is 70%. Nitrogen dioxide vapor preheated to 150° is passed into the reactor at a rate of 638 parts per hour, titanium tetrachloride vapor at 150° at a rate of 774 parts per hour and nitrogen diluent at a rate of 336 parts per hour. After about 40 minutes, the flow of nitrogen dioxide and titanium tetrachloride is interrupted and the nitrogen flow is continued to effect purging as in Example II.

A non-crystalline product is removed from the filter bag and calcined at 500° for one hour. The calcined product contains 92% to 95% anatase and 3% to 8% rutile.

*Example IV*

This example differs from Example II chiefly in that it involves a reactor temperature of 400°, an excess of nitrogen dioxide of about 100% and no diluent admixed with the streams of nitrogen dioxide and titanium tetrachloride. Nitrogen dioxide vapor preheated to 400° is introduced at a rate of 1080 parts per hour and the titanium tetrachloride heated to 400° at a rate of 1112 parts per hour. No nitrogen is admixed with these reactants. At the end of the run, which lasted about 33 minutes, the product is removed from the filter bag and calcined at 500° for about one hour. It is 100% anatase, determined by X-ray examination.

*Example V*

This example involves reaction of a solution of titanium tetrachloride in carbon tetrachloride with the nitrogen dioxide in the vapor phase. 24 pounds of liquid carbon tetrachloride containing 5% titanium tetrachloride is introduced into the reactor at a feed rate of 820 grams per hour. Nitrogen dioxide vapor is fed at a rate of 675 grams per hour. The liquid and reaction products are removed and recycled through the reactor. The temperature in the reactor is room temperature (about 20°).

After one hour operation under these conditions, the titanium tetrachloride is turned off followed by the nitrogen dioxide. Slurry collected in the reactor is removed and filtered. The solids are washed with carbon tetrachloride. The resultant washed product is heated to 250° to boil off residual titanium tetrachloride and carbon tetrachloride and then calcined at 500° for one hour. The product is substantially the same as those produced in the preceding examples.

*Example VI*

This example involves reacting liquid titanium tetrachloride with nitrogen dioxide in the vapor phase.

200 ml. of titanium tetrachloride is introduced into the reactor. Nitrogen dioxide in the vapor phase is bubbled through the body of liquid titanium tetrachloride at a rate of 540 grams per hour. Nitrogen is introduced along with the nitrogen dioxide to effect agitation of the titanium tetrachloride in the reactor. The reaction products pass through a filter bag in which the solid products collect and from which any suspended gases exit. The temperature in the reactor ranges from room temperature (20°) at the beginning of the run to about 60° at the end of the run.

The reaction product is removed from the filter bag, combined with that remaining in the reactor, and heated to 250° to boil off unreacted titanium tetrachloride. The resultant product is non-crystalline as shown by X-ray analysis. It is heated to 500° for one hour and the product thus produced contains 91% anatase and 9% non-crystalline material.

*Example VII*

This example involves reaction of both the titanium tetrachloride and the nitrogen dioxide in the liquid phase.

150 ml. of liquid nitrogen dioxide (as nitrogen tetroxide, $N_2O_4$) is introduced into the reactor. It is maintained at 0° to 2° by an ice bath. 100 ml. of titanium tetrachloride are added slowly to the nitrogen dioxide over a period of 20 minutes while agitating the contents of reactor by effecting movement of the reactor within the ice bath. The reaction mixture is maintained in the reactor for an additional 15 minutes. Thereafter the reactor is removed from the ice bath and heated to 40° for 30 minutes to drive off the excess nitrogen dioxide. The product is collected, washed with four successive washings of dry carbon tetrachloride in amount of 3 parts of carbon tetrachloride per portion. The solid product thus produced is heated to 500° for one hour. X-ray examination showed it to be chiefly anatase.

The products of the above examples before calcination are yellowish solids of low density. They contain adsorbed gases (chiefly chlorine and some nitrogen dioxide and nitrosyl chloride) so that when stored in a container the latter becomes filled with brownish fumes. The calcined products, e.g., the anatase formed, have good pigment properties as evidenced by their color in oil and tinting strengths.

An X-ray diffraction study of these reaction products disclosed no crystal structure. Hence they are amorphous for all practical purposes.

Chemical analyses of typical vapor phase reaction products, such as those produced in Examples I and II above, are expressed as follows:

|  | Product I, Percent | Product II, Percent |
|---|---|---|
| $TiO_2$ | 85.9 | 87.1 |
| $TiCl_4$ | 13.1 | 12.3 |
| $Cl_2$ | 0.9 | 0.6 |
| $N_2$ | 0.1 | ¹0.0 |
| Total | 100.0 | 100.0 |
| Total Ti as determined | 54.8 | 55.3 |
| Total Cl as determined | 10.7 | 9.8 |
| Total N as determined | 0.1 | ¹0.0 |

¹ Less than 0.05%.

It will be noted that this invention involves both the liquid phase and vapor phase reaction of titanium tetrachloride with nitrogen dioxide at temperatures below 450° C., preferably below 300° C. The vapor phase procedure is carried out at a temperature with the range of 140° to 450° C., preferably 140° to 300° C.

For reactions in which the titanium tetrachloride is in the liquid phase and the nitrogen dioxide is in the vapor phase, the temperature may be from room temperature up to the boiling point of pure titanium tetrachloride, about 135° C. under atmospheric pressure conditions when the pure titanium tetrachloride is used, or up to the boiling point of the solvent system when a solution is used. Under presure, higher temperatures may be used up to the vapor pressure of the liquid phase at the pressures used. For the liquid phase process in which both reactants are liquid, the reaction is carried out a a temperature within the range of 0° to 20° C. at atmospheric presure and at higher temperatures, if desired, when the process is carried out under superatmospheric pressures.

The solvent is used to keep the reaction mixture in a free flowing condition to facilitate the reaction going to completion. The concentration of the titanium tetrachloride in carbon tetrachloride as the solvent is preferably from 5% to 10%; higher concentrations may be used, if desired.

It will be further noted that the present invention provides a process of oxidizing titanium tetrachloride to produce amorphous titanium oxychloride convertible to a product containing predominantly titanium dioxide, which process is carried out at temperatures below 450° C., preferably below 300° C., and thus substantially minimizes the corrosion problems involved in the handling of the reactants and the reaction products. Moreover, the process of this invention results in a novel amorphous titanium oxychloride compound, useful as such or which can readily be converted into either rutile or anatase crystal form, or rutile or anatase pigments.

Since certain changes in carrying out the processes above described and certain modifications in the amorphous products which embody this invention may be made without departing from the scope of the invention, it is intended that all matter contained in the above description or shown in the accompanying drawings shall be interpreted as illustrative and not in a limiting sense.

What is claimed is:

1. The process which comprises reacting titanium tetrachloride and nitrogen dioxide in a reaction zone maintained at a temperature below 450° C. to produce an amorphous titanium compound containing at least about 40% by weight of titanium oxychloride, and recovering said amorphous titanium compound from the reaction zone.

2. The process which comprises reacting titanium tetrachloride and nitrogen dioxide at a temperature below 300° C. to produce an amorphous titanium oxychloride composition, and recovering said amorphous titanium oxychloride composition.

3. The process which comprises reacting titanium tetrachloride and nitrogen dioxide in the vapor phase at a temperature within the range of from 140° to 450° C. to produce an amorphous titanium compound containing at least about 40% by weight of titanium oxychloride, and recovering said amorphous titanium compound.

4. The process which comprises reacting titanium tetrachloride and nitrogen dioxide in the vapor phase at a temperature within the range of from 140° to 300° C. to produce an amorphous titanium oxychloride composition, and recovering said amorphous titanium oxychloride composition.

5. The process for the production of titanium dioxide in anatase crystal form which comprises reacting titanium tetrachloride and nitrogen dioxide at a temperature below 450° C. to produce an amorphous titanium oxychloride composition, heating this amorphous product to convert it to predominantly titanium dioxide and volatilize titanium tetrachloride, and thereafter heating the titanium dioxide to a temperature of from 400° to 900° C. to produce anatase.

6. The process for the production of titanium dioxide in anatase crystal form which comprises reacting titanium tetrachloride and nitrogen dioxide at a temperature below 450° C. to produce an amorphous titanium oxychloride, heating this amorphous product in air at a temperature of from 200° to 400° C. to convert it to predominantly titanium dioxide and volatilize titanium tetrachloride, and thereafter heating the titanium dioxide in the presence of an inhibitor which inhibits the formation of rutile and promotes the formation of anatase to a temperature of from 400° to 900° C. to produce anatase.

7. The process for the production of titanium compounds which comprises reacting titanium tetrachloride and nitrogen dioxide in the vapor phase at a temperature of from 140° to 450° C. to produce an amorphous titanium oxychloride composition, and heating this amorphous composition to convert it predominantly to titanium dioxide and volatilize titanium tetrachloride.

8. The process for the production of titanium dioxide compounds which comprises reacting titanium tetrachloride and nitrogen dioxide in the vapor phase at a temperature of 140° to 450° C. to produce amorphous titanium oxychloride, nitrosyl chloride and chlorine, separating the titanium oxychloride from the nitrosyl chloride and chlorine, oxidizing the nitrosyl chloride to produce nitrogen dioxide and chlorine, and recycling the nitrogen dioxide for reaction with the titanium tetrachloride.

9. The process of oxidizing titanium tetrachloride to produce titanium dioxide products, which comprises preheating a stream of titanium tetrachloride to a temperature within the range of 140° to 550° C., preheating a stream of nitrogen dioxide to a temperature within the range of 140° to 550° C., continuously flowing said streams into admixture with each other into a reaction zone maintained at a temperature within the range of 140° to 450° C., continuously removing from said reaction zone a stream of reaction products containing titanium oxychloride, nitrosyl chloride and chlorine, separating the titanium oxychloride from said stream, heating the titanium oxychloride to convert it to titanium dioxide, oxidizing the nitrosyl chloride in said stream from which the titanium oxychloride has been separated to form nitrogen dioxide and chlorine, separating the nitrogen dioxide from the chlorine and recycling the nitrogen dioxide for reaction with the titanium tetrachloride.

10. The process of oxidizing titanium tetrachloride to produce titanium dioxide, which comprises preheating a stream of titanium tetrachloride to a temperature within the range of 140° to 550° C., preheating a stream of nitrogen dioxide to a temperature within the range of 140° to 550° C., continuously flowing said streams into admixture with each other in a reaction zone maintained at a temperature within the range of 140° to 300° C., continuously removing from said reaction zone a stream of reaction products containing nitrisyl chloride, chlorine and titanium oxychloride, separating the amorphous titanium oxychloride from said stream, heating the amorphous titanium oxychloride to produce titanium dioxide, separating and recovering the chlorine, oxidizing the nitrosyl chloride from which the amorphous titanium oxychloride has been removed to form nitrogen dioxide and chlorine, separating the nitrogen dioxide from the chlorine and recycling the nitrogen dioxide for reaction with the titanium tetrachloride.

11. The process of producing titanium dioxide from titanium tetrachloride which comprises flowing streams of titanium tetrachloride and nitrogen dioxide into admixture with each other into a reaction zone maintained at a temperature of from 140° to 450° C., the amount of nitrogen dioxide thus introduced into said reaction zone being in excess of the stoichiometric amount required for reaction with the titanium tetrachloride, removing the titanium oxychloride thus produced, and heating the titanium oxychloride to convert it to titanium dioxide.

12. The process of producing titanium dioxide which comprises feeding a stream of liquid titanium tetrachloride into a reaction zone, introducing nitrogen dioxide in amount at least equal to the stoichiometric amount required for reaction with the titanium tetrachloride to produce titanium oxychloride, nitrosyl chloride and chlorine, maintaining the reaction zone at a temperature below the boiling point of the titanium tetrachloride, removing the gaseous reaction products from the reaction zone, separately removing the titanium oxychloride thus produced from the reaction zone and heating the titanium oxychloride to produce titanium dioxide.

13. The process as defined in claim 12, in which the liquid titanium tetrachloride is a solution of titanium tetrachloride in carbon tetrachloride.

14. The process of producing titanium dioxide which comprises introducing into a reactor maintained at a temperature of about 0° C. liquid nitrogen dioxide and liquid titanium tetrachloride, agitating the reaction mixture while maintaining said reactor at a temperature of about 0° C., thereafter heating the reaction mixture to drive off the excess nitrogen dioxide, recovering amorphous titanium oxychloride composition containing titanium tetrachloride and chlorine from the reaction mixture and heating the amorphous titanium oxychloride composition to produce titanium dioxide.

15. An amorphous titanium oxychloride composition produced by reacting titanium tetrachloride and nitrogen dioxide at a temperature below 450° C. to form a composition containing at least about 40% by weight of titanium oxychloride, and recovering the composition thus produced, said composition upon heating being converted predominantly to titanium dioxide, titanium tetrachloride and chlorine.

16. A titanium composition produced by reacting titanium tetrachloride and nitrogen dioxide at a temperature of from 300° C. to 450° C., said composition consisting of from about 40% to 60% by weight of anatase and from about 40% to 60% by weight of amorphous titanium dioxide.

References Cited in the file of this patent

UNITED STATES PATENTS

| | | |
|---|---|---|
| 2,273,431 | Booge | Feb. 17, 1942 |
| 2,406,465 | Keats | Aug. 27, 1946 |
| 2,502,357 | Schaumann | Mar. 28, 1950 |
| 2,761,760 | Kamlet | Sept. 4, 1956 |
| 2,900,244 | Bradstreet et al. | Aug. 18, 1959 |

OTHER REFERENCES

J. W. Mellor's "A Comprehensive Treatise on Inorganic and Theoretical Chemistry," vol. 7, 1927 ed., page 82, Longmans, Green and Co., New York.

UNITED STATES PATENT OFFICE
CERTIFICATE OF CORRECTION

Patent No. 3,063,797                                    November 13, 1962

Clarence L. Hildreth

It is hereby certified that error appears in the above numbered patent requiring correction and that the said Letters Patent should read as corrected below.

Column 2, line 7, for "itanium" read -- titanium --; column 6, line 46, after "slurry" insert -- of --; column 7, line 57, for "The product calcined at 500° producing a product" read -- The product is removed from the filter bag separator. --; column 11, line 15, for "nitrisyl" read -- nitrosyl --.

Signed and sealed this 23rd day of April 1963.

(SEAL)
Attest:

ERNEST W. SWIDER                                        DAVID L. LADD
Attesting Officer                                              Commissioner of Patents